United States Patent [19]

Fukumura et al.

[11] Patent Number: 5,214,418
[45] Date of Patent: May 25, 1993

[54] LIQUID CRYSTAL DISPLAY DEVICE

[75] Inventors: Kenichiro Fukumura; Kazuo Yoshioka, both of Nagasaki, Japan

[73] Assignee: Mitsubishi Denki Kabushiki Kaisha, Tokyo, Japan

[21] Appl. No.: 402,779

[22] Filed: Sep. 5, 1989

[30] Foreign Application Priority Data

Dec. 22, 1988 [JP] Japan .................. 63-322106

[51] Int. Cl.$^5$ .................................. G09G 3/36
[52] U.S. Cl. .................. 340/784; 358/160; 358/236
[58] Field of Search ............ 340/701, 703, 765, 784, 340/793; 358/10, 27, 236, 241, 160, 168, 169

[56] References Cited

U.S. PATENT DOCUMENTS

| | | | |
|---|---|---|---|
| 4,064,484 | 12/1977 | Mese et al. | 358/169 |
| 4,403,253 | 9/1983 | Morris et al. | 358/169 |
| 4,498,081 | 2/1985 | Fukushima et al. | 340/793 |
| 4,523,232 | 6/1985 | Kameda et al. | 358/169 |
| 4,589,019 | 5/1986 | Dischert et al. | 358/168 |
| 4,628,362 | 12/1986 | Waehner | 358/169 |
| 4,642,628 | 2/1987 | Murata | 340/784 |
| 4,642,693 | 2/1987 | Fuse et al. | 358/169 |
| 4,642,694 | 2/1987 | Yamagishi et al. | 358/160 |
| 4,712,099 | 12/1987 | Maeda | 340/703 |
| 4,842,371 | 6/1989 | Yasuda et al. | 340/784 |
| 4,864,290 | 9/1989 | Waters | 340/793 |
| 4,878,047 | 10/1989 | Fuse et al. | 340/703 |

*Primary Examiner*—Richard Hjerpe
*Attorney, Agent, or Firm*—Burns, Doane, Swecker & Mathis

[57] ABSTRACT

A liquid crystal display device for image display realizing clear and optimum image display by comprising a brightness detector for detecting brightness of image signal after digital conversion and a voltage dividing circuit for outputting the reference voltage in the level depending on the detected value in view of adjusting contrast of display screen by judging brightness of image signal and controlling the reference voltage.

1 Claim, 2 Drawing Sheets

LIQUID CRYSTAL DISPLAY DEVICE

BACKGROUND OF THE INVENTION

1. Field of the Invention

The present invention relates to an improvement of a liquid crystal display device for displaying images of improved contrast ratio.

2. Description of the Prior Art

FIG. 1 is a block connection diagram indicating a conventional liquid crystal display device disclosed in the Japanese Patent Laid-Open No. 62-188477. In this figure, a reference numeral 1 designates an analog switch; 2, an autolevel control circuit; 3, an analog/digital converter (hereinafter referred to as A/D converter); 4, a multiplexer working as a signal processing circuit for supplying separated signals of red, green and blue to a drive circuit for image display.

Operations will be explained. In FIG. 1, a video signal input from an input system not illustrated is separated to three primary-color signals of red, green and blue (hereinafter referred respectively as R, G, B) by a color demodulation circuit (not illustrated), these separated analog primary-color signals are time-multiplexed by an analog switch 1 and these are supplied to an autolevel control circuit 2 as an S-RGB signal. The autolevel control circuit 2 clamps the S-RGB signal to the lower limit reference voltage Vr−− of the A/D converter 3 and generates an upper limit reference voltage Vr++. Next, a multiplexer as a signal processing circuit separates again the output of the A/D converter into the three primary-color signals of R, G, B.

Though depending on resolution of the A/D converter 3, a dynamic drive type liquid crystal display device cannot obtain sufficient contrast ratio generally, and therefore it has been in such a tendency as generating a saturated white or black display. Considering such tendency, it is naturally possible to detect the maximum value of the image signal and use such value as the upper limit reference voltage of the A/D converter 3 in order to improve such tendency. However, the three primary-color signals must be time-multiplexed to the one signal by the analog switch 1. As a result, the prior art has been accompanied by a problem that the analog switch cannot follow the high speed operation in case the resolution of liquid crystal display screen, namely the number of pixels, particularly the number of pixels in the horizontal direction increases.

SUMMARY OF THE INVENTION

The present invention has been proposed to overcome such a problem described above and it is a first object to provide a liquid crystal display device which can improve contrast by changing a virtual contrast ratio without using an analog switch.

It is a second object of the present invention to provide a liquid crystal display device which automatically adjust contrast corresponding to the level of image signal and attain clear and optimum image display even when an image is dark by preventing a saturation of black level on the display screen.

It is a third object of the present invention to provide a liquid crystal display device which ensures an excellent contrast ratio in comparison with that of the prior art and can be manufactured rather economically than the prior art.

It is a fourth object of the present invention to automatically compensate for contrast of display screen by utilizing the digital processing technique for image signal.

In view of attaining the objects of the present invention, the liquid crystal display device of the present invention detects the most significant bit obtained in the output side of an A/D converter with a brightness detector and controls the reference voltage of the A/D converter for the predetermined period using a divided voltage.

Accordingly, the brightness detector detects the most significant bit of the output of the A/D converter, judges brightness and darkness of image signal based on such detected signal and thereby automatically adjusts contrast of display screen.

The aforementioned and other objects and a novel feature of the present invention will become apparent by thorough understanding of following detailed explanation with reference to the accompanying drawings. However, the drawings are accompanied only for the convenience of explanation and do not specify the scope of the present invention.

DETAILED DESCRIPTION OF THE PREFERRED EMBODIMENTS

Figure 1:
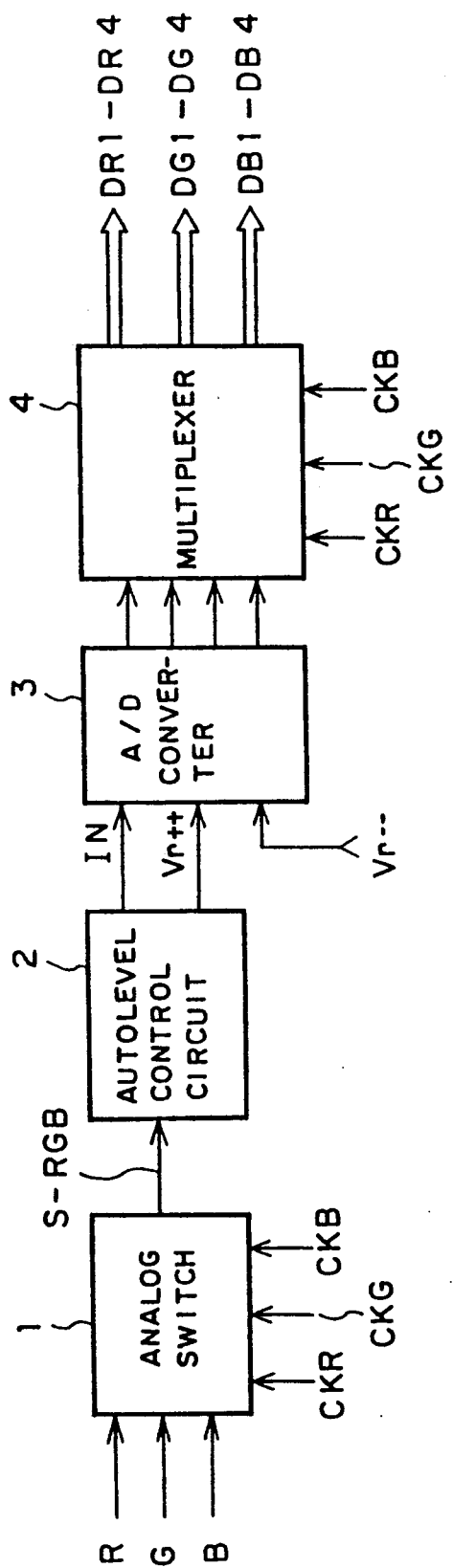
FIG. 1 is a block connection diagram indicating a liquid crystal display device in the prior art.
Figure 2:
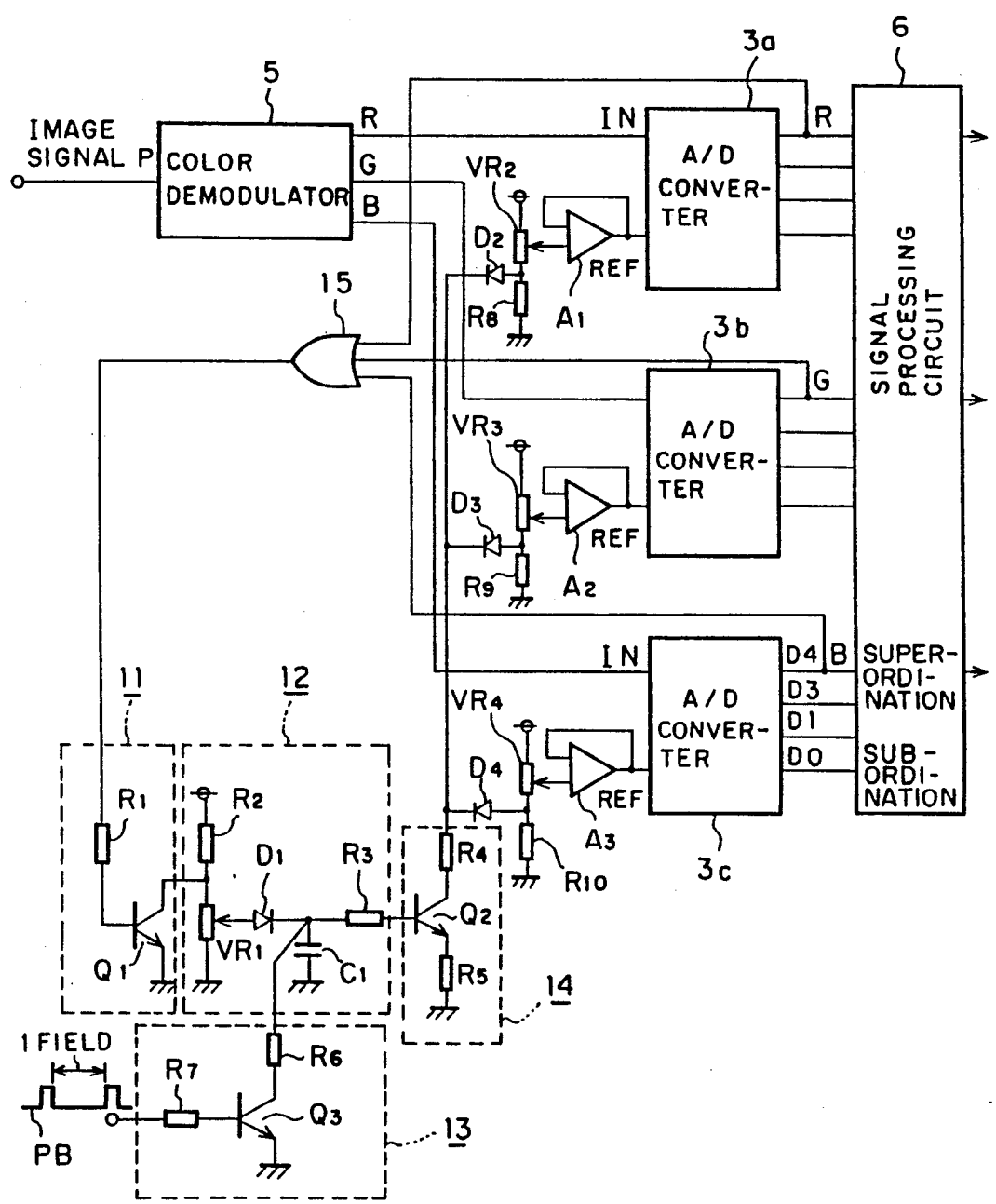
FIG. 2 is a block connection diagram indicating the liquid crystal display device as an embodiment of the present invention.

An embodiment of the present invention will be explained with reference to the accompanying drawings. In FIG. 2, 3a, 3b, 3c designate A/D converters; 5, a color demodulator; 6, a signal processing circuit; 11, a brightness detector consisting of a resistor R1 and a transistor Q1 to detect brightness of image signal; 12, an integrator consisting of resistors R2, R3, a capacitor C1, a diode D1 and a variable resistor VR1; 13, a discharge circuit by a blanking pulse PB consisting of resistors R6, R7 and a transistor Q3; 14, a voltage dividing circuit consisting of resistors R4, R5 and a transistor Q2; R8, R9, R10, voltage dividing resistors; VR2, VR3, VR4, voltage dividing variable resistors; A1, A2, A3, reference voltage output amplifiers; 15, OR gate for logical OR of the most significant bits of the A/D converters 3a, 3b, 3c; D2, D3, D4, reverse current shut-off diodes.

Operations will be explained below. An image signal input to the input terminal P is first separated to three primary-color signals of R, G, B in the color demodulator and the primary-color signals are then supplied to the A/D converters 3a, 3b, 3c. These A/D converters 3a, 3b, 3c convert the R, G, B signals to quantized digital signals. The most significant bits of these digital signals, R, G, B are calculated on logical OR in the OR gate 15 and then an output at the OR gate 15 is input to the brightness detector 11 for detection of brightness of image signal. For example, in the case of a dark image signal, the most significant bits of digital outputs of the A/D converters 3a, 3b, 3c are all set to low level. Therefore, the transistor Q1 turns OFF. In this case, a capacitor C1 of integrator 12 is charged with the voltage set by the variable resistor VR1 and then a base voltage of transistor Q2 is held to this voltage during the one field period of the vertical blanking pulse PB. As a result, the transistor Q2 turns ON and a voltage determined by the variable resistor VR2, and resistors R4, R5, R8 is supplied to the A/D converter 3a as the reference voltage for example. The similar operations are carried out for the A/D converters 3b, 3c. In this case, the resolution of the A/D converters 3a, 3b, 3c virtually increase because the reference voltage becomes lower. On the other hand, in the case of a bright image signal, the output of OR gate 15 becomes high level, the transistor Q1 turns ON and the capacitor C1 is not charged. Accordingly, the transistor Q2 turns OFF and a voltage determined by the variable resistor VR2 and voltage dividing resistor R8 is applied to the A/D converter 3a as the reference voltage input, for example. The reference voltages of the A/D converters 3a–3c can take two kinds of values depending on the quality of image signal input, namely the brightness of the image signal. If the image is dark, the virtual contrast can be raised by setting such two kinds of voltage values to the optimum value and high quality image can be obtained by preventing the saturated black image of display screen.

In this embodiment, the A/D converters 3a–3c of 4 bits are used but the converters are not limited only to them.

As explained previously, the present invention has the constitution that the reference voltage of the A/D converter is controlled with the most significant bit output signal of the A/D converter and therefore provides the effect that if an image is dark, the contrast can be adjusted automatically depending on the level of image signal, and thereby saturated black image on the display screen can be prevented and clear and optimum display image can be obtained.

What is claimed is:

1. A liquid crystal display device having a color demodulator for demodulating an input color image signal to three primary-color signals, an analog/digital converter for quantizing the color image signal demodulated by said color demodulator to a digital signal and a signal processing circuit for processing the quantized digital signal and supplying it to a driving circuit for image display, said liquid crystal display device comprising a brightness detector for detecting a brightness level of the image signal depending on a most significant bit output only, from said analog/digital converter through quantization, and a voltage dividing circuit for inputting a reference voltage of a level depending on a detected value of said brightness detector to said analog/digital converter for a specified period, and further comprising a capacitor for providing a reference voltage indicating brightness of a predetermined level when the brightness level of the image signal detected by said brightness detector is dark.

* * * * *